(12) United States Patent
Walsh et al.

(10) Patent No.: US 9,467,220 B2
(45) Date of Patent: Oct. 11, 2016

(54) CONTROLLER DEVICE IMPLEMENTED IN A REPEATING SYSTEM ASSOCIATED WITH A VEHICLE FOR EXTENDING NETWORK SIGNAL RANGE

(71) Applicant: Verizon New Jersey Inc., Newark, NJ (US)

(72) Inventors: Jeffrey M. Walsh, Verona, NJ (US); Woo Beum Lee, Basking Ridge, NJ (US)

(73) Assignee: Verizon New Jersey Inc., Newark, NJ (US)

( * ) Notice: Subject to any disclaimer, the term of this patent is extended or adjusted under 35 U.S.C. 154(b) by 331 days.

(21) Appl. No.: 13/904,201

(22) Filed: May 29, 2013

(65) Prior Publication Data

US 2014/0355511 A1 Dec. 4, 2014

(51) Int. Cl.
*H04B 7/15* (2006.01)
*H04B 7/155* (2006.01)
*H04L 25/20* (2006.01)
*H04B 3/58* (2006.01)
*H04L 25/40* (2006.01)
*H04L 25/22* (2006.01)

(52) U.S. Cl.
CPC ........... *H04B 7/15* (2013.01); *H04B 3/58* (2013.01); *H04B 7/15507* (2013.01); *H04B 7/15535* (2013.01); *H04B 7/15557* (2013.01); *H04B 7/15592* (2013.01); *H04L 25/20* (2013.01); *H04L 25/22* (2013.01); *H04L 25/40* (2013.01)

(58) Field of Classification Search
CPC ... H04B 7/15; H04B 7/15557; H04B 7/15535; H04B 7/15592; H04B 7/15507; H04B 3/58; H04B 10/29; H04B 10/2918; H04L 25/20; H04L 25/22; H04L 25/40
USPC ............................................ 370/315; 37/315
See application file for complete search history.

(56) References Cited

U.S. PATENT DOCUMENTS

| 6,679,338 | B1 * | 1/2004 | Tucker ............................. 172/6 |
| 2007/0015462 | A1 * | 1/2007 | Dean et al. .................... 455/15 |
| 2008/0076437 | A1 * | 3/2008 | Wilson et al. ................ 455/450 |
| 2010/0184369 | A1 * | 7/2010 | Cho et al. .................... 455/11.1 |
| 2012/0142269 | A1 * | 6/2012 | Wilhite ............................ 455/7 |

* cited by examiner

*Primary Examiner* — Afshawn Towfighi
*Assistant Examiner* — Mewale Ambaye

(57) ABSTRACT

A controller device, implemented in a repeating system associated with a vehicle, may activate an antenna device included in the repeating system to cause the antenna device to receive a network signal and transmit an amplified network signal, corresponding to the network signal, to an area around the vehicle; and cause an amplification device, included in the repeating system, to receive the network signal, amplify the network signal to form the amplified network signal, and provide the amplified network signal for transmission by the antenna device.

20 Claims, 8 Drawing Sheets

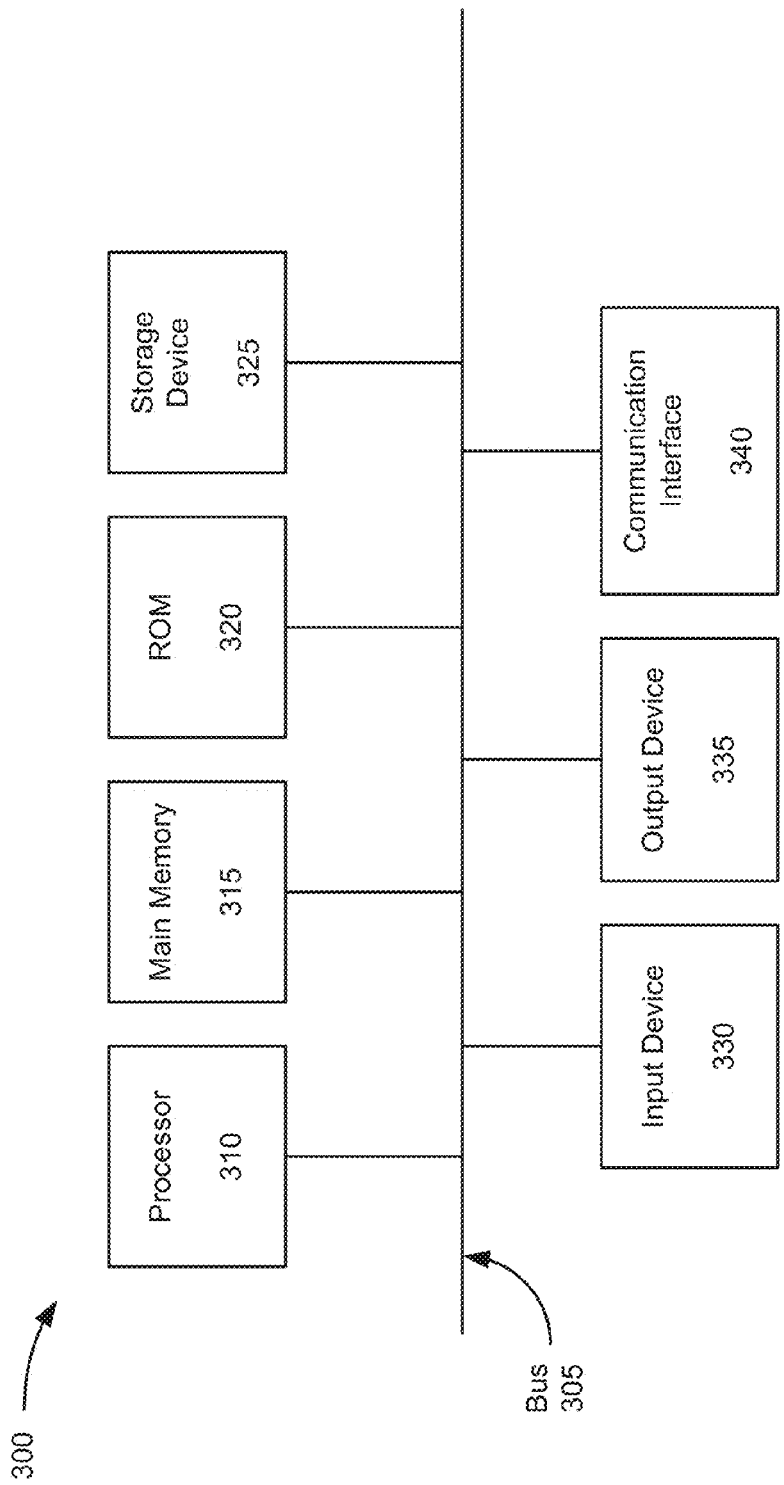

400

| Condition 410 | Instruction 420 |
|---|---|
| Location = 38.857573,-77.338303, 1 km | Activate all antennas Amp voltage = 10 V |
| Passive signal frequency = Frequency A | Activate all active-mode antennas Amp voltage = 20 V |
| Passive signal strength = 3 dBm | Activate rear active-mode antenna Amp voltage = 10 V |
| Header message = Emergency | Activate all active-mode antennas Amp voltage = 20 V |
| Passive signal strength = 0 dBm | Deactivate active-mode antennas Amp voltage = 0 V |

Fig. 4

CONTROLLER DEVICE IMPLEMENTED IN A REPEATING SYSTEM ASSOCIATED WITH A VEHICLE FOR EXTENDING NETWORK SIGNAL RANGE

BACKGROUND

User devices communicate via network devices, such as base stations, gateways, wireless routers, cellular towers, or the like. User devices can connect to a network device via a wireless signal transmitted by the network device. The wireless signal has a particular range that is limited to a particular distance. When the user device is outside of the range, the user device may not receive the wireless signal and may, therefore, be unable to connect to the network device. Also, the wireless signal is sometimes obstructed (e.g., by objects, buildings, interfering wireless signals, etc.), thereby preventing the user device from connecting to the network device.

BRIEF DESCRIPTION OF THE DRAWINGS

FIG. 3 illustrates example components of a device that may be used within the environment of FIG. 2A or 2B;

FIG. 4 illustrates an example data structure that may be stored by one or more devices in the environment of FIG. 2A or 2B;

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may repeat a network signal (e.g., a wireless signal, such as a cellular signal, a radio signal, a wireless fidelity (WiFi) signal, etc.) to eliminate "dead zones" (e.g., geographic areas from which a wireless signal cannot be received by a network device of a wireless service provider network).

Figure 1:
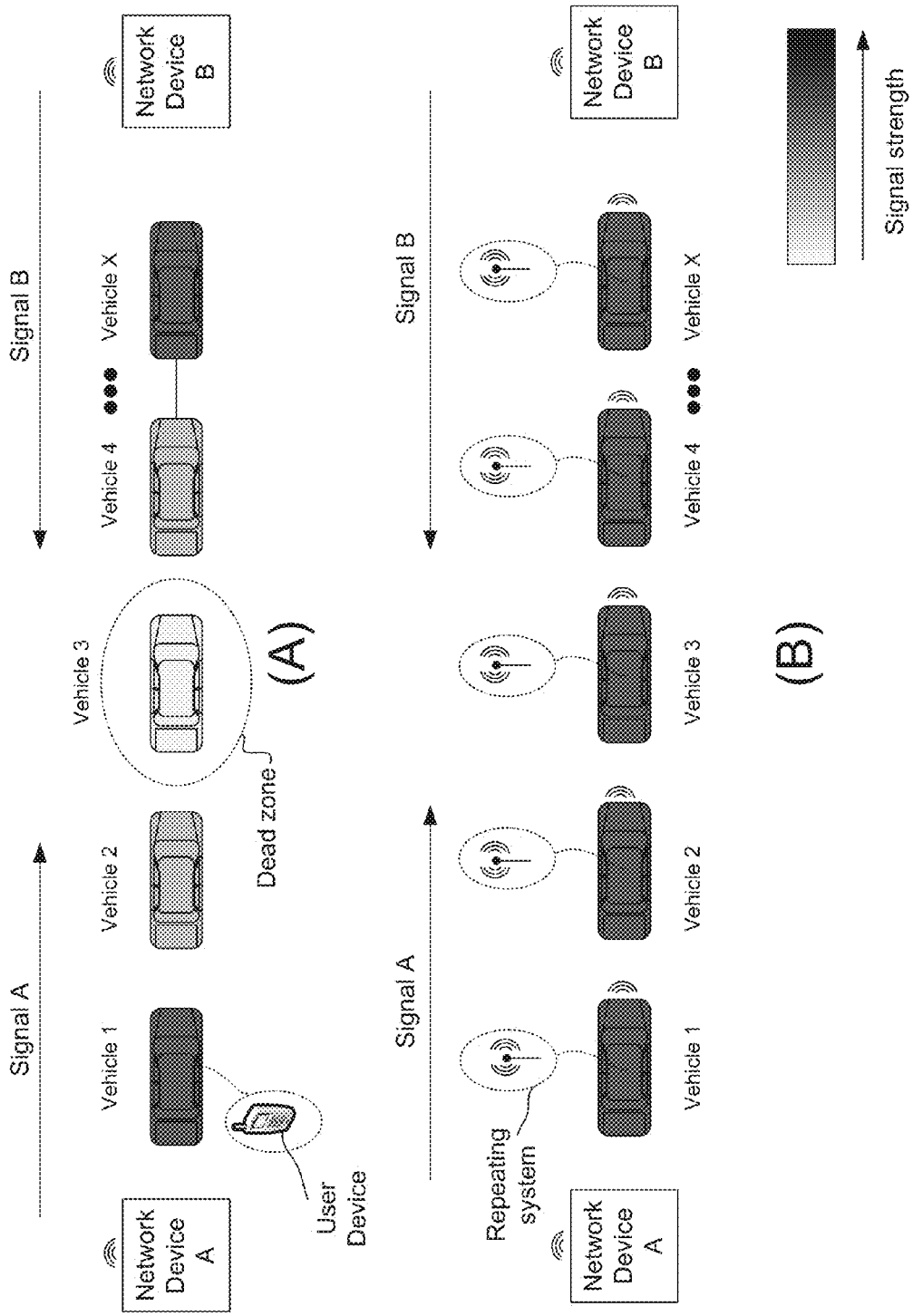
FIG. 1 illustrates an example overview of an implementation described herein.

FIG. 1 illustrates an example overview of an implementation described herein. In FIG. 1, assume that multiple vehicles (e.g., vehicles 1 through X where X≥1) each include respective user devices that may connect to a network device via a network signal transmitted by the network device. In FIG. 1, signal strength at a geographic location of each vehicle is illustrated by a shading of each vehicle. The shading is proportional to the strength of the network signal at each vehicle. That is, the darker the shade of the vehicle, the stronger the network signal is at the particular location of the vehicle.

As shown in (A) of FIG. 1, a first network device (e.g., network device A) may transmit a first network signal (e.g., signal A) to allow a user device to connect to network device A. A second network device (e.g., network device B) may transmit a second network signal (e.g., signal B) to allow a user device to connect to network device B. In some implementations, network device A and network device B may be located in a manner that creates a dead zone (e.g., when a transmission range of signal A and a transmission range of signal B do not overlap, thereby creating a region having no network signal). For example, assume that vehicle 3 in (A) is located in a dead zone and, as a result, a user device located in vehicle 3 may not be able to connect to either network device A or network device B.

Referring to (B), each of vehicles 1 through X may include a repeating system to receive a network signal (e.g., a network signal provided by network device A and/or network device B), amplify the network signal, and transmit the network signal over a particular area. For example, the repeating system of vehicle 1 may receive signal A from network device A, amplify signal A, and transmit signal A in a particular area that includes vehicle 2. The repeating system of vehicle 2 may receive signal A from network device A and/or vehicle 1, and transmit signal A to an area that includes vehicle 3. In some implementations (e.g., when a repeating system receives multiple network signals from multiple sources), the repeating system may determine a signal strength of each network signal, and transmit the stronger network signal. For example, the repeating system of vehicle X may receive signal B from network device B, and transmit signal B to an area that includes vehicle 4.

As a result, a network signal may be repeated across multiple vehicles to maintain and/or increase the network signal strength over a larger area than when the network signal is not repeated. Further, dead zones may be eliminated when multiple vehicles are used to repeat signals over previous dead zones. In some implementations, the network signal may be repeated while the vehicle is in motion, while the vehicle is stationary, and/or while the vehicle is powered on or powered off. Also, in some implementations, the repeating system may be implemented in a static object, such as a building, a tower, a sign, or the like.

Figure 2A:
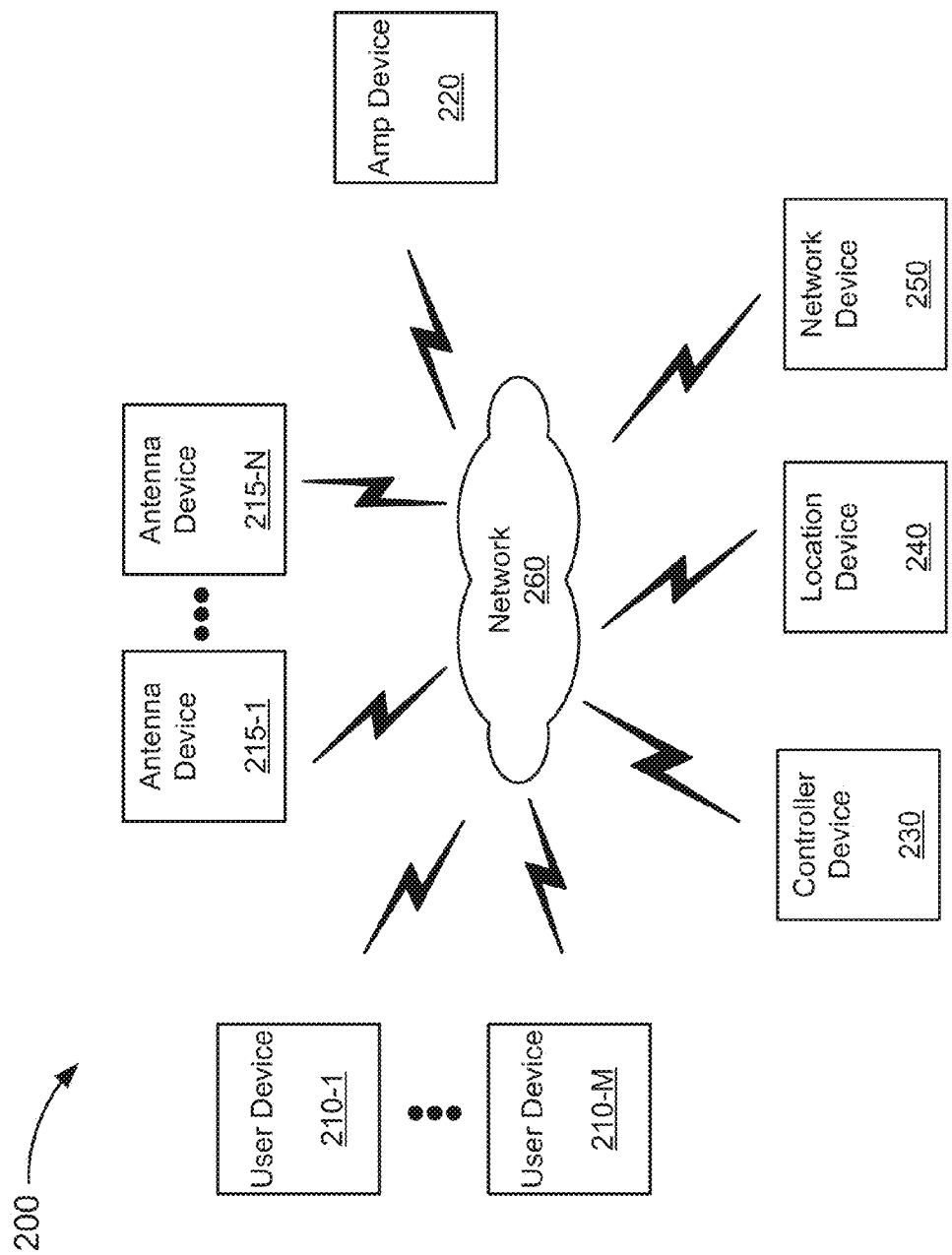
FIGS. 2A-2B illustrate an example environment in which systems and/or methods, described herein, may be implemented.
Figure 2B:
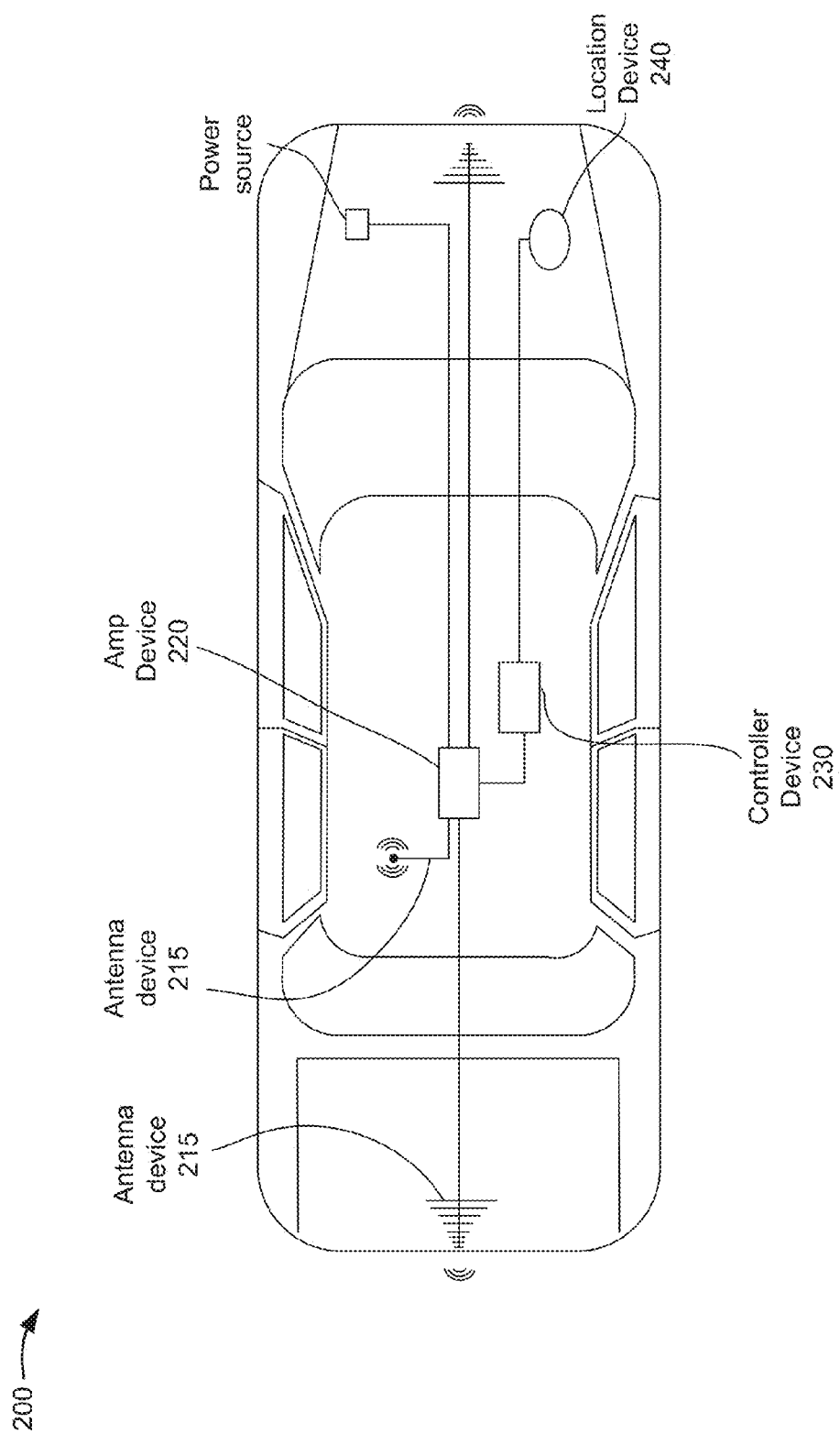

FIGS. 2A-2B illustrate an example environment 200 in which systems and/or methods described herein may be implemented. As shown in FIG. 2A, environment 200 may include user devices 210-1, . . . , 210-M (where M≥1), antenna devices 215-1, . . . , 215-N (where N≥1), amplification device 220 (hereinafter referred to as "amp device 220"), controller device 230, location device 240, network device 250, and network 260. A repeating system, implemented within a vehicle, may include antenna device 215, amp device 220, controller device 230, and/or location device 240.

User device 210 may include any device capable of communicating via a network, such as network 260. For example, user device 210 may correspond to a mobile communication device (e.g., a smart phone or a personal digital assistant (PDA)), a portable computer device (e.g., a laptop or a tablet computer), a gaming device, or another type of device. In some implementations, user device 210 may connect to network device 250 via a network signal transmitted by network device 250 in order to access network 260.

Antenna device 215 may include a signal transmitter, receiver, transceiver or a collection of signal transmitters, receivers, or transceivers. In some implementations, antenna device 215 may include a directional antenna, a monopole antenna, and/or some other type of antenna to receive a signal (e.g., a network signal, a radio frequency signal, a packet-based network signal, and/or some other type of signal) and transmit the signal across a particular geographic area. For example, antenna device 215 may transmit the signal over an area having a particular shape, such as circular shape, an oval shape, a rectangular shape, or the like. Additionally or alternatively, antenna device 215 may transmit the signal in a straight line facing a particular direction. Additionally or alternatively, antenna device 215 may transmit the signal in some other manner.

In some implementations, antenna device 215 may include a passive-mode antenna device that may consume less than a threshold amount of energy (e.g., such that the passive-mode antenna device may remain powered on to receive a network signal). Additionally, or alternatively, antenna device 215 may include an active-mode antenna device having a signal detection/transmission range that is greater than a passive-mode antenna device 215, but consumes more energy than a passive-mode antenna device 215. As described in greater detail below with respect to FIG. 4, an active-mode antenna device 215 may be activated based on a network signal received by a passive-mode antenna device 215.

Amp device 220 may include a signal amplification device or a collection of signal amplification devices. In some implementations, amp device 220 may include a power amplifier, a valve amplifier, a transistor amplifier, an operational amplifier, a fully differential amplifier, an oscilloscope vertical amplifier, a distributed amplifier, a switched mode amplifier, and/or some other type of amplification device. In some implementations, amp device 220 may connect with antenna device 215 to amplify a signal received via antenna device 215 and to cause antenna device 215 to transmit the amplified signal (e.g., to increase a range in which the signal can be received or detected by user device 210 and/or by another antenna device 215).

Controller device 230 may include a computing device or a collection of computing devices. In some implementations, controller device 230 may interpret a signal received by antenna device 215. In some implementations, controller device 230 may activate and/or deactivate a particular antenna device 215. For example, controller device 230 may power on (e.g., activate) antenna device 215 or power off (e.g., deactivate) antenna device 215. In some implementations, controller device 230 may activate/deactivate antenna device 215 based on information received by location device 240 and/or a signal received by a passive-mode antenna device 215. For example, controller device 230 may activate an active-mode antenna device 215 when the passive-mode antenna device 215 receives a signal. Further, controller device 230 may deactivate the active-mode antenna device 215 when a signal is not received (e.g., by the active-mode antenna device 215 or the passive-mode antenna device 215) within a particular threshold amount of time (e.g., to reduce energy consumption).

In some implementations, controller device 230 may activate antenna device 215 based on information received by location device 240. For example, controller device 230 may activate antenna device 215 based on a particular geographic location of controller device 230 (e.g., based on a particular geographic location of a vehicle in which controller device 230 is implemented).

In some implementations, controller device 230 may adjust a voltage output of amp device 220 to modify an amplitude of a network signal provided by antenna device 215 and/or a transmission range of the network signal. In some implementations, the transmission range may be based on the voltage output by amp device 220.

Location device 240 may include a computing device or a collection of computing devices. In some implementations, location device 240 may include global positioning system (GPS) and/or some other type of device that identifies a location (e.g., a location of a vehicle in which location device 240 is implemented). As described above, location device 240 may provide location information to controller device 230 to cause controller device 230 to activate/deactivate antenna device 215, adjust a power output of amp device 220, and/or perform some other function.

Network device 250 may include one or more network devices that receive, process, and/or transmit traffic, such as audio, video, text, and/or other data, destined for and/or received from user device 210. In some implementations, network device 250 may include a wireless router, a base station, a gateway, a switch, a wireless access point, and/or some other type of network device. In some implementations, network device 250 may transmit a network signal to connect user device 210 to network 260. In some implementations, network device 250 may be an eNodeB (eNB) device and may be part of a long term evolution (LTE) network and/or some other network. Network device 250 may receive traffic from and/or send traffic to network 260 via one or more gateways, such as serving gateway (SGW) and/or a packet data network (PDN) gateway (PGW). Network device 250 may send traffic to and/or receive traffic from user device 210 via an air interface. One or more of network devices 250 may be associated with a radio access network (RAN), such as an LTE network.

Network 260 may include one or more wired and/or wireless networks. For example, network 260 may include a cellular network, a public land mobile network (PLMN), a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or a combination of these or other types of networks.

As described above, some devices in environment 200 may be part of a repeating system and may be implemented in a vehicle. For example, referring to FIG. 2B, a vehicle may include antenna device 215, amp device 220, controller device 230, and/or location device 240. As shown in FIG. 2B, antenna devices 215 may be provided throughout the vehicle, to send/receive network signals provided by network device 250. For example, antenna devices 215 may be provided at opposite ends of the vehicle to transmit/receive network signals in multiple directions. As shown in FIG. 2B, amp device 220 and controller device 230 may connect with antenna device 215 and/or location device 240 in order to activate/deactivate particular antenna devices 215. In some implementations, antenna device 215, amp device 220, controller device 230, and/or location device 240 may connect with a power source (e.g., a primary battery, a back-up battery, and/or some other power source).

The quantity of devices and/or networks, illustrated in FIGS. 2A-2B, is not limited to what is shown. In practice, there may be additional devices and/or networks; fewer devices and/or networks; different devices and/or networks; or differently arranged devices and/or networks than illustrated in FIGS. 2A-2B. For example, a vehicle may include any number of antenna devices 215 arranged in some other manner than what is shown in FIG. 2B. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

FIG. 3 illustrates example components of a device 300 that may be used within environment 200 of FIG. 2A or 2B.

Device 300 may correspond to user device 210, antenna device 215, amp device 220, controller device 230, location device 240, and/or network device 250. Each of user device 210, antenna device 215, amp device 220, controller device 230, location device 240, and/or network device 250 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like component that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3.

FIG. 4 illustrates an example data structure 400 that may be stored by one or more devices in environment 200. In some implementations, data structure 400 may be stored in a memory of controller device 230. In some implementations, data structure 400 may be stored in a memory separate from, but accessible by, controller device 230. In some implementations, data structure 400 may be stored by some other device in environment 200, such as antenna device 215, amp device 220, location device 240, and/or network device 250.

A particular instance of data structure 400 may contain different information and/or fields than another instance of data structure 400. In some implementations, data structure 400 may include information identifying instructions that a particular controller device 230, associated with a particular repeating system for a particular vehicle, may execute based on detecting a particular condition. Another instance of data structure 400 may include information identifying instructions that another controller device 230, associated with another repeating system for another vehicle, may execute.

As shown in FIG. 4, data structure 400 may include signal condition field 410 and instruction field 420.

Condition field 410 may store information identifying a particular network signal related condition. Instruction field 420 may store information identifying an instruction that controller device 230 may execute based on detecting that the condition is met. For example, condition field 410 may store information identifying a particular geographic area and instruction field 420 may store an instruction to direct controller device 230 to activate a particular antenna device 215 when a repeating system, associated with controller device 230, enters a particular geographic area (e.g., when a vehicle that implements the repeating system enters the geographic area).

In the example shown in FIG. 4, data structure 400 may store an instruction to direct controller 230 to activate all antenna devices 215, associated with the vehicle, when the vehicle enters a geographic area that is 1 kilometer (km) from the longitude/latitude coordinates of 38.857573, −77.338303. As further shown in FIG. 4, data structure 400 may store an instruction to direct controller device 230 to instruct amp device 220 to provide a particular voltage (e.g., 10 volts (V)) to antenna devices 215 (e.g., in order to activate antenna devices 215).

In some implementations, a particular vehicle may include a passive-mode antenna device 215 and/or an active-mode antenna device 215. In some implementations, data structure 400 may store an instruction to activate all active-mode antenna devices 215, associated with the particular vehicle, and to provide the active-mode antenna devices 215 with 20 V when the passive-mode antenna device 215 receives a signal having a particular frequency. For example, the particular frequency may correspond to an emergency signal and may be transmitted by network device 250 during a public emergency, such as when network load on network device 250 exceeds a particular threshold as a result of a surge of usage of network device 250 by user devices 210. In some implementations, the emergency signal may cause controller device 230 to activate antenna devices 215 (e.g., by directing amp device 220 to provide a voltage to antenna devices 215), thereby allowing antenna devices 215 to alleviate network load on network device 250. In some implementations, the particular frequency may correspond to some other type of signal that may be transmitted at any time by network device 250 to cause controller device 230 to activate antenna devices 215.

In some implementations, data structure 400 may include an instruction to activate a particular antenna device 215 and to provide a particular voltage to the particular antenna device 215 (e.g., an active-mode antenna device 215 located in a rear portion of the vehicle) based the presence of a signal having a particular signal strength (e.g., as identified by a passive-mode antenna device 215). In some implementations, a signal may include a packet-based message having information stored by a header of the packet-based message. As shown in FIG. 4, data structure 400 may include an instruction to activate particular antenna devices 215 based on a header of the packet-based message. For example, data structure 400 may include an instruction to activate all active-mode antenna devices 215, associated with the vehicle, and to provide the antenna devices 215 with a voltage of 20 V when the header message includes the message "emergency." In some implementations, data structure 400 may include an instruction to deactivate active-mode antenna devices 215 when no signal is present (e.g., when no signal is received by a passive-mode antenna device 215, such as when signal strength is zero).

While particular fields are shown in a particular format in data structure 400, in practice, data structure 400 may include additional fields, fewer fields, different fields, or differently arranged fields than are shown in FIG. 4. Also, FIG. 4 illustrates examples of information stored by data structure 400. In practice, other examples of information stored by data structure 400 are possible. For example, data structure 400 may store some other instruction based on detecting some other condition (e.g., vehicle conditions, such as vehicle movement, vehicle movement direction, vehicle speed, vehicle analytics, vehicle gear selection, etc.).

Figure 5:
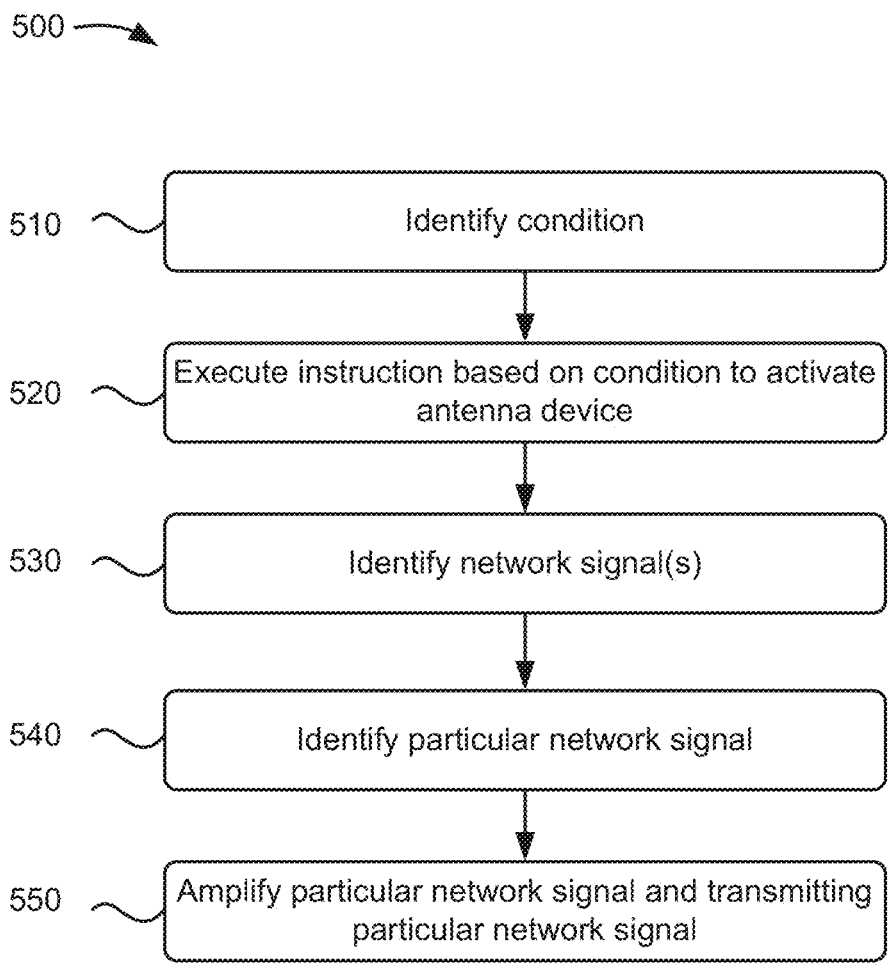
FIG. 5 illustrates a flowchart of an example process for transmitting a network signal by a repeating system implemented in a vehicle.

FIG. 5 illustrates a flowchart of an example process for transmitting a network signal by a repeating system implemented in a vehicle. In some implementation, process 500 may be performed by one or more components of controller device 230. In some implementations, some or all of blocks of process 500 may be performed by one or more components of another device in environment 200 (e.g., antenna device 215, amp device 220, location device 240, and/or network device 250), or a group of devices including or excluding controller device 230.

As shown in FIG. 5, process 500 may include identifying a condition (block 510). For example, controller device 230 may identify a condition, such as a geographic location of a vehicle associated with a repeating system that includes controller device 230. Additionally, or alternatively, controller device 230 may identify a condition, such as a frequency of a signal received by antenna device 215 (e.g., a passive-mode antenna device 215), information stored by a header of a signal received by antenna device 215, a strength of a signal received by antenna device 215, and/or some other condition. That is, a passive-mode antenna device 215 may be used to identify the presence of a network signal while consuming less than a threshold amount of energy. As described in greater detail below, an active-mode antenna device 215 may be activated to receive and/or transmit network signals based on the presence of a network signal identified by a passive-mode antenna device 215. Some examples of identifying a condition are described above with respect to data structure 400.

Process 500 may also include executing an instruction based on the condition to activate an antenna device (block 520). For example, controller device 230 may identify a corresponding instruction, associated with the condition, based on information stored by data structure 400. In some implementations, the instruction may direct controller device 230 to adjust a voltage provided by a power source to power on and activate a particular antenna device 215 (e.g., an active-mode antenna device 215), associated with the vehicle, and to provide the particular antenna device 215 with a particular voltage. Some examples of activating a particular antenna device 215 based on the identification of a condition are described above with respect to FIG. 4.

Process 500 may further include identifying network signal(s) (block 530). For example, controller device 230 may identify one or more network signals received by antenna device 215 (e.g., an active-mode antenna device 215 that is activated in accordance with block 520). In some implementations, controller device 230 may connect with antenna device 215 to receive a corresponding electrical signal associated with a network signal received by antenna device 215. In FIG. 5, assume that controller device 230 identifies multiple network signals. For example, antenna device 215 may receive multiple network signals transmitted by one or more network devices 250 and/or transmitted by one or more antenna devices 215 associated with another vehicle or another object.

Process 500 may also include identifying a particular network signal (block 540). For example, when controller device 230 identifies multiple network signals, controller device 230 may identify a particular network signal having the strongest signal strength of the multiple network signals. In some implementations, controller device 230 may identify a particular network signal having the weakest signal strength of the multiple network signals. In some implementations, controller device 230 may randomly select a particular signal of the multiple network signals. In some implementations, controller device 230 may identify signal strength of a network signal based on a voltage associated with the network signal.

Process 500 may further include amplifying the particular network signal and transmitting the particular network signal (block 550). For example, controller device 230 may direct amp device 220 to provide a particular voltage to antenna device 215 thereby amplifying a network signal received by antenna device 215. In some implementations, controller device 230 may provide the particular network signal to antenna device 215 (e.g., the activate-mode antenna device 215 activated in accordance with block 520) to cause antenna device 215 to transmit the particular network signal.

As a result, a passive-mode antenna device 215 may be used to identify a condition (e.g., such as the presence of a network signal, the presence of a network signal having an emergency message or emergency frequency, etc.) while consuming less than a particular threshold amount of energy. Further, an active-mode antenna device 215 may be activated based on the presence of the network signal in order to transmit the signal such that another antenna device 215, associated with another vehicle, may receive the signal, amplify the signal, and transmit the signal. As described above, the active-mode antenna device 215 may be activated based on a geographic location of the vehicle (e.g., a geographic location that is known to have a dead zone) to receive a network signal and to amplify and transmit the signal through the dead zone.

While a particular series of blocks has been described above with regard to FIG. 5, the operations, data flows, and/or the order of the blocks may be modified in other implementations. Further, non-dependent operations and/or data flows may be performed in parallel. Also, one or more of the blocks may be omitted in some implementations.

Figure 6:
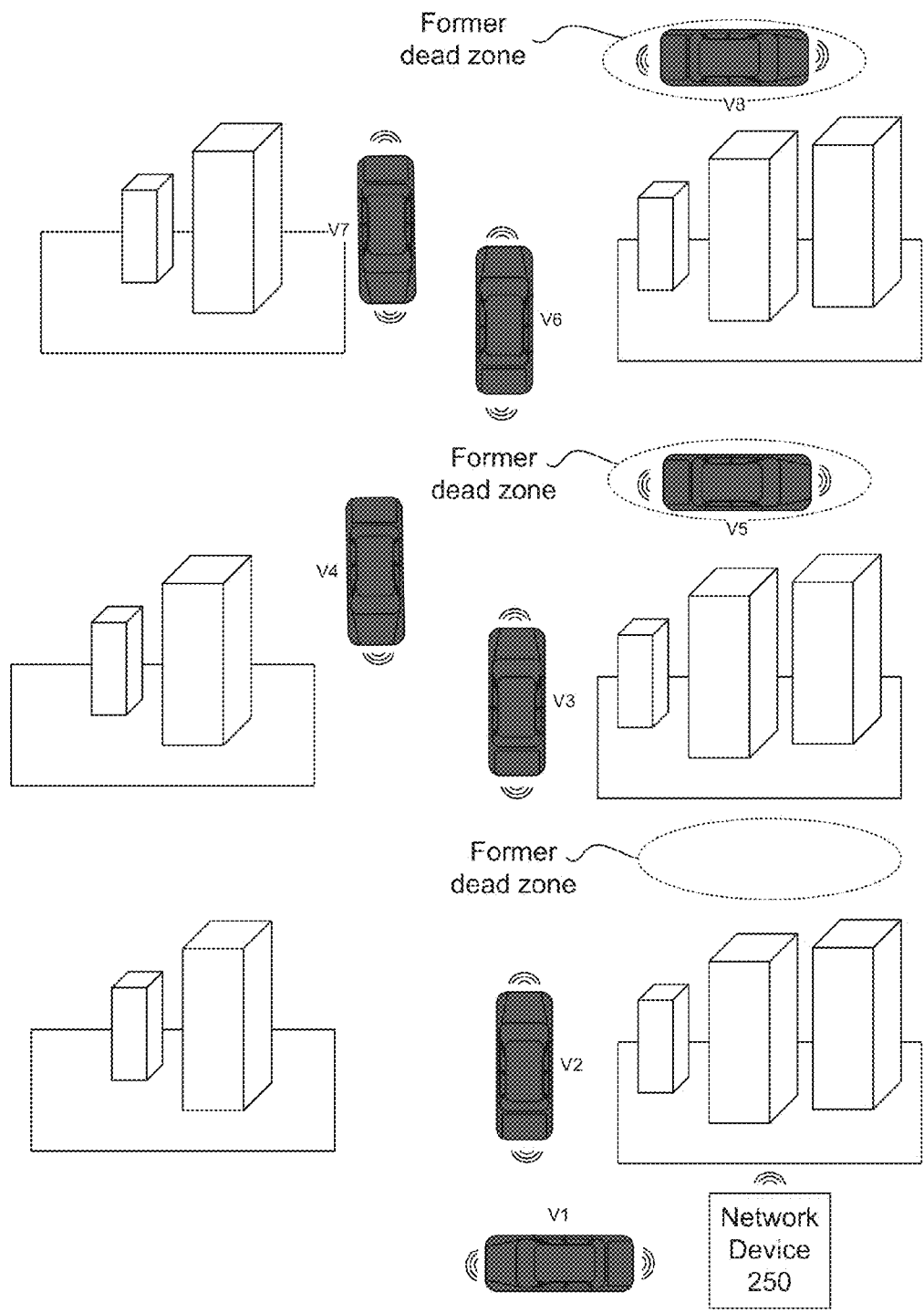
FIGS. 6-7 illustrate example implementations as described herein.

FIG. 6 illustrates an example implementation as described herein. As shown in FIG. 6, network device 250 may transmit a network signal over a particular geographic area. In FIG. 6, assume that the network signal, provided by network device 250, is obstructed by one or more buildings (or other types of objects) in a path of the network signal. As a result of the obstruction, the particular geographic area may include one or more dead zones.

In FIG. 6, assume that vehicles V1 through V8 include repeating systems having one or more antenna devices 215, amp devices 220, controller devices 230, and/or location devices 240. Further, assume that antenna devices 215 are active. Given these assumptions, antenna device 215 of vehicle 1 may receive the network signal from network device 250, amplify the network signal, and transmit the network signal. In some implementations, antenna device 215 of vehicle 2 may receive the network signal transmitted by antenna device 215 vehicle 1 and/or network device 250, identify a particular network signal of the two network signals received (e.g., the network signal with the strongest signal strength), and transmit the particular network signal. In a similar manner, antenna devices of vehicles 2 through 8 may receive network signals provided by network device 250 and/or by antenna devices of vehicles 1 through 8, identify a particular network signal (when multiple signals are received), and transmit the particular network signal. As a result, dead zones may be eliminated by transmitting the network signal across former dead zones (e.g., areas in which network signals, provided by network device 250, previously did not exist as a result of obstructions).

While a particular example is described with respect to FIG. 6, it will be apparent that the above description is merely an example implementation. Other examples are possible and may differ from what was described with regard to FIG. 6.

Figure 7:
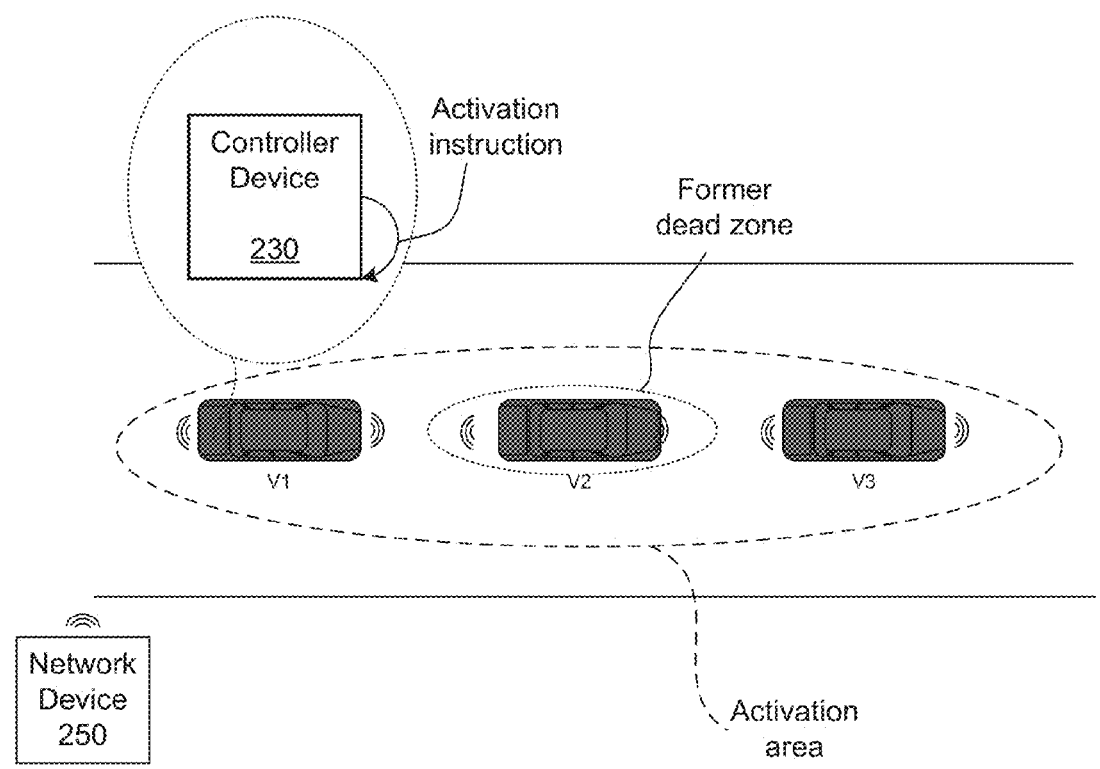

FIG. 7 illustrates an example implementation as described herein. In FIG. 7, assume that vehicles V1 through V3 include repeating systems having one or more antenna devices 215, amp devices 220, controller devices 230, and/or location devices 240. Further, assume that controller device 230 stores information (e.g., in data structure 400) identifying a geographic area in which controller device 230 is to activate antenna device 215 (e.g., an activation area that includes a dead zone). Given these assumptions, controller device 230 may execute an activation instruction to activate antenna device 215 (e.g., based on location information provided by location device 240). For example, as shown in FIG. 7, controller device 230 of vehicle V1 may initiate the activation instruction when vehicle V1 enters the activation area to activate an antenna device 215 of vehicle V1. In some implementations, antenna device 215 of vehicle V1 may receive a network signal from network device 250 before entering a dead zone, amplify the network signal, and provide the network signal towards vehicle V2, which may, in turn, receive the network signal amplify the network signal, and provide the network signal towards vehicle V3. As a result, vehicles V1 through V3 may repeat a network signal, originated from network device 250, to eliminate a dead zone.

As described above, a repeating system may be implemented in a vehicle in order to expand a range of a wireless signal originated from network device 250. As a result, dead zones may be eliminated to prevent service outages when a user device 210 relocates to the dead zones. Further, passive-mode antenna devices 215 may detect the presence of a signal while consuming less than a threshold amount of energy, such that controller device 230 may activate an active-mode antenna device 215 when the presence of a signal is identified (e.g., to preserve energy for when a signal is not present). Also, in some implementations, network device 250 may send a signal having a particular frequency or a particular header to cause controller device 230 to activate antenna device 215 to alleviate network device 250, such as in a public emergency when network device 250 may be overloaded.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
    identifying, by a controller device in a repeating system implemented in a vehicle, that the vehicle has entered a geographic region based on receiving information from a location device that detects a location of the vehicle;
    receiving, by the controller device, a network signal via a passive-mode antenna device included in the vehicle;
    identifying, by the controller device, a particular frequency of the network signal or a particular header data included in the network signal;
    activating, by the controller device in the repeating system implemented in the vehicle, an active-mode antenna device, different than the passive-mode antenna device and implemented in the repeating system, based on identifying that the vehicle has entered the geographic area and based on identifying the particular frequency of the network signal or the particular header data included in the network signal,
        activating the active-mode antenna device including causing the active-mode antenna device to receive the network signal and transmit an amplified network signal, corresponding to the network signal, to an area around the vehicle; and
    causing, by the controller device, an amplification device, included in the repeating system, to receive the network signal, amplify the network signal to form the amplified network signal, and provide the amplified network signal for transmission by the active-mode antenna device.

2. The method of claim 1, further comprising:
adjusting a voltage associated with the amplification device,
where a transmission range of the amplified network signal is based on the voltage.

3. The method of claim 1, where the network signal, received by the active-mode antenna device, is a particular network signal of a plurality of network signals received by the active-mode antenna device,
the method further comprising:
receiving the plurality of network signals via the active-mode antenna device; and
identifying the particular network signal based on a strength of the particular network signal,
where causing the amplification device to receive the network signal, amplify the network signal, and provide the amplified network signal for transmission by the active-mode antenna device includes causing the amplification device to receive the particular network signal, amplify the particular network signal to form an amplified particular network signal, and provide the amplified particular network signal for transmission by the active-mode antenna device.

4. The method of claim 1, where activating the active-mode antenna device includes:
powering on the active-mode antenna device based on identifying that the vehicle has entered the geographic area, and
the method further comprising:
deactivating the active-mode antenna device based on the information from the location device,
deactivating the active-mode antenna device including powering off the active-mode antenna device.

5. A system comprising:
a repeating system implemented in a vehicle, the repeating system comprising:
an active-mode antenna device;
a passive-mode antenna device that is different than the active-mode antenna device;
an amplification device; and
a controller device to:
identify when a condition is met,
the condition including receiving a network signal of a particular frequency or receiving particular header data in a message associated with the network signal at the passive-mode antenna device;
activate, based on identifying that the condition is met, the active-mode antenna device to cause the active-mode antenna device to receive the network signal and transmit an amplified network signal, corresponding to the network signal, to an area around the vehicle; and
cause the amplification device to receive the network signal, amplify the network signal to form the amplified network signal, and provide the amplified network signal for transmission by the active-mode antenna device.

6. The system of claim 5, where the condition includes information identifying a geographic area,
where when identifying that the condition is met, the controller device is to identify that the condition is met based on the vehicle entering the geographic area.

7. The system of claim 5, where the controller device is further to adjust a voltage associated with the amplification device,
where a transmission range of the amplified network signal is based on the voltage.

8. The system of claim 5, where the network signal, received by the active-mode antenna device, is a particular network signal of a plurality of network signals received by the active-mode antenna device,
where the controller device is further to:
receive the plurality of network signals via the active-mode antenna device; and
identify the particular network signal based on a strength of the particular network signal,
where when causing the amplification device to receive the network signal, amplify the network signal, and provide the amplified network signal for transmission by the active-mode antenna device, the controller device is to cause the amplification device to receive the particular network signal, amplify the particular network signal to form an amplified particular network signal, and provide the amplified particular network signal for transmission by the active-mode antenna device.

9. The system of claim 5, where the condition is a first condition,
where the controller device, when activating the active-mode antenna device, is to:
power on the active-mode antenna device based on identifying that the first condition is met,
where the controller device is further to:
power off the active-mode antenna device when a second condition is met.

10. A non-transitory computer-readable medium for storing instructions, the instructions comprising:
a plurality of instructions which, when executed by one or more processors of a controller device associated with a repeating system implemented within a vehicle, cause the one or more processors to:
receive a network signal via a passive-mode antenna device;
identify a particular frequency or particular header data in a message associated with the network signal;
identify when a condition to activate an active-mode antenna device, different from the passive-mode antenna device, is met, the condition being met based on
the particular frequency or the particular header data in the message associated with the network signal being received by the passive-mode antenna device;
activate, based on identifying that condition is met, the active-mode antenna device associated with the vehicle to cause the active-mode antenna device to receive the network signal and transmit an amplified network signal, corresponding to the network signal, to an area around the vehicle; and
cause an amplification device, included in the vehicle, to receive the network signal, amplify the network signal to form the amplified network signal, and provide the amplified network signal for transmission by the active-mode antenna device.

11. The non-transitory computer-readable medium of claim 10,
where one or more instructions, of the plurality of instructions, to identify that the condition is met, cause the one or more processors to identify that the condition is met when the vehicle enters a geographic area.

12. The non-transitory computer-readable medium of claim 10, where the network signal, received by the active-mode antenna device is a particular network signal of a plurality of network signals received by the active-mode antenna device,
  where the plurality of instructions further cause the one or more processors to:
    receive the plurality of network signals via the active-mode antenna device; and
    identify the particular network signal based on a strength of the particular network signal,
  where one or more instructions, of the plurality of instructions, to cause the amplification device to receive the network signal, amplify the network signal, and provide the amplified network signal for transmission by the active-mode antenna device, cause the one or more processors to cause the amplification device to receive the particular network signal, amplify the particular network signal to form an amplified particular network signal, and provide the amplified particular network signal for transmission by the active-mode antenna device.

13. The method of claim 1, where the location device is a global positioning system (GPS) device.

14. The system of claim 5, where the active-mode antenna device has a communication range that is greater than the passive-mode antenna device, and
  where the passive-mode antenna device when activated consumes less energy than the active-mode antenna device when activated.

15. The system of claim 5, where the active-mode antenna device has a communication range that is greater than the passive-mode antenna device, and
  where the passive-mode antenna device when activated consumes less energy than the active-mode antenna device when activated.

16. The non-transitory computer-readable medium of claim 10, where the active-mode antenna device has a communication range that is greater than the passive-mode antenna device, and
  where the passive-mode antenna device when activated consumes less energy than the active-mode antenna device when activated.

17. The method of claim 1, where activating the active-mode antenna device is based on identifying the particular header data included in the network signal.

18. The system of claim 5, where the condition includes receiving the network signal of the particular frequency.

19. The non-transitory computer-readable medium of claim 10, where the condition is met based on the particular frequency and the particular header data in the message associated with the network signal being received by the passive-mode antenna device.

20. The method of claim 1, where the geographic region includes a dead zone.

* * * * *